*W. Fowler,*
*Basin Faucet,*
№ 12,817. Patented May 8, 1855.
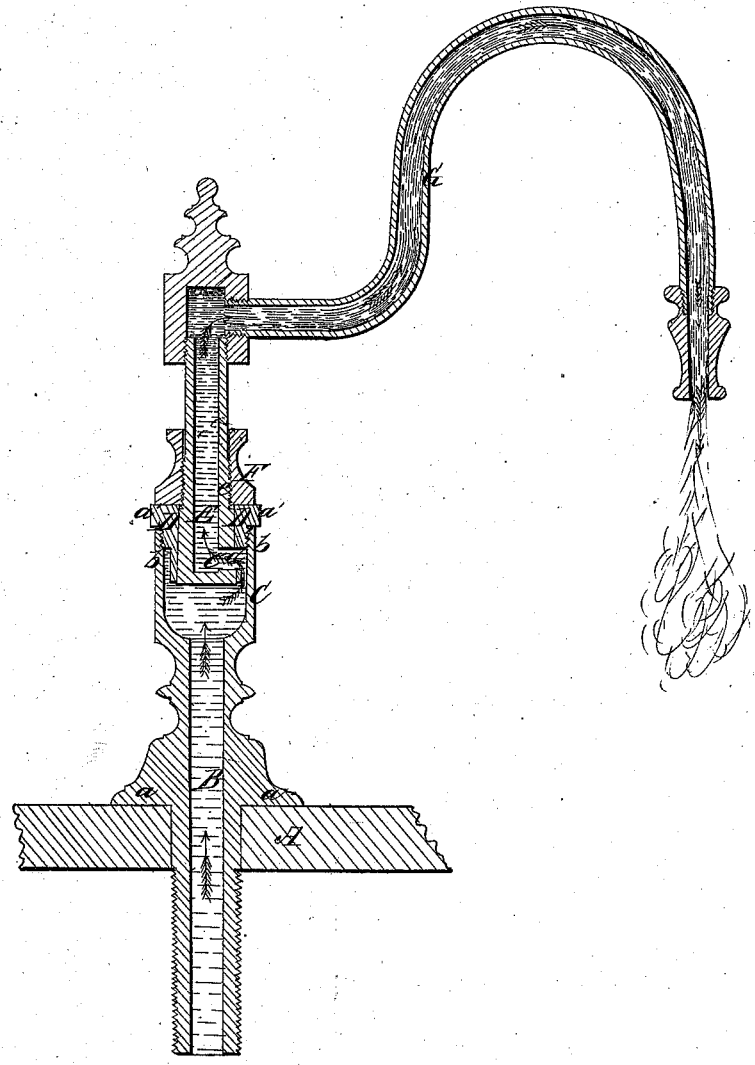

UNITED STATES PATENT OFFICE.

WILLIAM FOWLER, OF NEW YORK, N. Y.

FAUCET.

Specification of Letters Patent No. 12,817, dated May 8, 1855.

*To all whom it may concern:*

Be it known that I, WILLIAM FOWLER, of the city, county, and State of New York, have invented a new and useful Improvement in Faucets for Washbasins, Sinks, &c.; and I do hereby declare that the following is a full, clear, and exact description of the same, reference being had to the annexed drawing, making a part of this specification, said drawing being a vertical section of my improvement.

The nature of my invention consists in the peculiar construction and arrangement of the faucet, as will be hereafter fully shown and described, whereby the faucet may be readily detached from the main pipe or tube in case it requires repairing or a new faucet may be applied without detaching the stationary pipe or tube from its supports.

To enable others skilled in the art to fully understand and construct my invention, I will proceed to describe it.

A, represents a platform or sill, through which the main pipe or tube B, passes. The pipe or tube B, is stationary, and has a shoulder ($a$) which rests upon the upper surface of the platform or sill A, the pipe or tube being secured underneath the platform or sill in any proper manner. The platform or sill A, may support a washbasin, sink, or other vessel for receiving water.

The pipe or tube, B, is connected below to a water pipe or reservoir containing water under pressure, and the water passes upward within the pipe or tube B, as shown by the red arrows. The upper end of the pipe or tube B, is provided with a socket C, having a screw thread ($b$) cut in the upper part of its inner surface, in which a valve seat, D, is secured, said valve seat having a flanch ($a'$) around its upper end, which bears upon the upper end of the socket C. The valve seat also has a conical opening through its center in which the lower end of a tube E, fits, the end of the tube, E, corresponding in form to the opening in the valve seat. The lower end of the tube E, is closed, but an opening ($c$) is made through its side near its lower end, and a corresponding opening ($d$) is made through the side of the valve seat D.

F, is a nut which works on a screw thread ($e$) cut on the tube E.

G, is a nozzle which is attached permanently to the tube E, and communicates with the interior of the tube.

By screwing the nut F, downward upon the upper surface of the valve seat D, the lower end of the tube E, is drawn snugly within the valve seat D, and by turning the nozzle G, till the opening ($c$) in the tube E, coincides with the opening ($d$) in the valve seat D, the water passes up in the tube E, and through the nozzle G, it being understood that the pipe E, is connected with, and turns with the nozzle G, and when the nozzle G, is turned so that the openings ($c$, $d$) coincide with each other, the end of the nozzle is directly over the basin or sink.

It will be seen that by the above improvement, all leakage is prevented, as the flanch ($a'$) of the valve seat D, may, if necessary have suitable packing interposed between it and the upper surface or end of the socket C, and this is the only place where leakage can possibly occur. By unscrewing the nut F, the whole valve may be detached from the main pipe or tube B, and easily repaired, if repairs are necessary, or a new valve may be inserted without moving or disturbing the main pipe or tube B.

The ordinary faucets in use have the nozzle G, turning on the tube E, which is stationary, or merely a continuation of the main pipe or tube B, and the valve is formed within a collar at the inner end of the nozzle which fits over the tube E. The valve therefore is liable to leak both at the top and bottom of the collar, and in case of repairs, the main tube or pipe must be detached from the platform or sill A.

My improvement is simple, not liable to get out of repair, and may be repaired when necessary, with the greatest facility.

What I claim as new and desire to secure by Letters Patent is—

The construction of the faucet as herein shown and described; viz, having the lower end of the tube E, fitted within a valve seat D, which seat is screwed into the upper part of a socket, C, at the upper part of the main pipe or tube, B, and adjusting the lower end of the tube E, snugly within the valve seat, D, by means of the nut F; the tube E, turning within the seat D; the seat D, and tube E, being provided with openings (*c*, *d*), which, when made to coincide with each other by turning the nozzle G, and tube E, allow the water to pass up through the nozzle.

WILLIAM FOWLER.

Witnesses:
S. H. WALES,
I. G. MASON.